C. T. DAY.

Assignor, by mesne Assignments, to E. SPAETH.

Skates.

No. 8,590. Reissued Feb. 18, 1879.

Witnesses.
Otto Lufeland.
Wm Miller.

Inventor.
Charles T. Day.
by
Van Santvoord & Hauff
his attorneys.

N. PETERS, PHOTO-LITHOGRAPHER, WASHINGTON, D. C.

UNITED STATES PATENT OFFICE.

CHARLES T. DAY, OF NEWARK, NEW JERSEY, ASSIGNOR, BY MESNE ASSIGNMENTS, TO EDWARD SPAETH.

IMPROVEMENT IN SKATES.

Specification forming part of Letters Patent No. 116,935, dated July 11, 1871; Reissue No. 8,590, dated February 18, 1879; application filed January 16, 1879.

*To all whom it may concern:*

Be it known that I, CHARLES T. DAY, of Newark, in the county of Essex and State of New Jersey, have invented a new and useful Improvement in Skates, which improvement is fully set forth in the following specification, reference being had to the accompanying drawings, in which—

Figure 1:
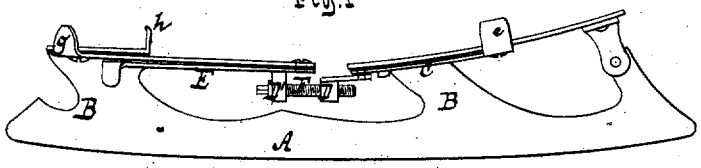
Figure 2:
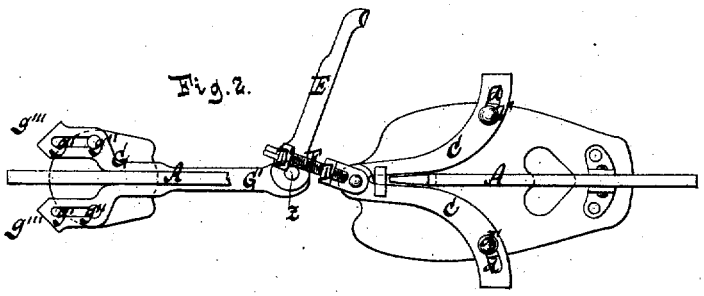
Figure 3:
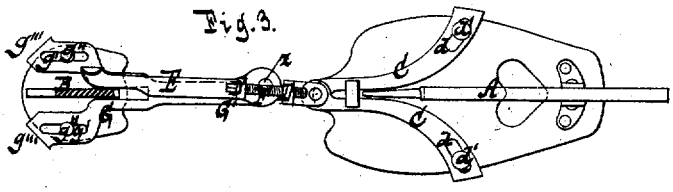

Figure 1 represents a side view when the heel and sole clamps are wide open. Fig. 2 is an inverted plan, partly in section, when the heel and sole clamps are partially closed. Fig. 3 is a similar view when the heel and sole clamps are fully closed.

Similar letters indicate corresponding parts.

This invention consists in the combination, in a skate, of movable clamps for grasping the sole, and longitudinally-sliding clamps for grasping the heel at the back part thereof, a stationary spur or abutment for the breast of the heel, and a hand-lever adapted to operate both sets of clamps; also, in the combination, in a skate, of the heel and toe clamps, and of a lever, swinging on a pivot, which is situated on one side of the center-line of said clamps, for the purpose of holding the clamps firmly in their closed position; and, further, in the combination, with movable clamps for grasping the sole, longitudinally-sliding clamps for grasping the heel at the back part thereof, and with a hand-lever adapted to operate both sets of clamps, of a regulating-screw for adjusting the clamps to heels and soles of different sizes.

In the drawings, the letter A designates the runner of the skate, supporting the sole and heel plates on standards B. C C designate the sole-clamps, which are united by a pivot at their rear ends, whence they extend in curved form forward and outward, and are provided at their ends with jaws *c* to grasp the sole. In the bend of each clamp C is formed a curved slot, *d*, through which passes a stud or pin, *d'*, secured in the under side of the sole-plate. This pin *d'* is provided with a flanged head, and serves to support the ends of the clamps, and to guide them outward and inward when the lever is operated. The pin which unites the clamps C C also connects therewith a toggle-joint, D, which is provided with a female screw at its end to engage with the adjusting-screw, which has its bearing in the swivel D', pivoted to the lever E. The end of this lever is pivoted to the stem of the heel-clamping device G, which consists of the branching arms *g'''*, two jaws, *g*, to clasp the heel, and of the main stem G', by which the arms *g'''* are connected to each other and to the lever E. These arms *g'''* are provided with slots *g'*, to receive the guiding and supporting studs *g''*, which are secured in the under side of the heel-plate. From the inner edge of the heel-plate rises a spur, *h*, which forms an abutment for the breast of the heel.

When the lever E occupies the position shown in Fig. 2, the sole-clamps C C are thrown wide open, and the heel-clamps *g g* are moved back away from the spur *h*; but by swinging the lever E back under the heel-plate the sole-clamps are drawn together and caused to bite into the opposite edges of the sole, and the heel-clamps *g g* are drawn forward, so as to retain the heel firmly between their teeth and the tooth of the stationary spur *h*.

When the lever E is thrown out to the position shown in Fig. 2, the head of the adjustable screw is in a convenient position to be turned either by hand or by a suitable tool, so that both sets of clamps can be adjusted for soles and heels of different sizes.

The lever E is connected to the stem G of the heel-clamps *g g* by a pivot, *z*, which is so arranged in relation to the toggle D and swivel D' that when the lever E is swung back under the heel-plate, the pivot *z* will lie without the line of traction connecting the pivots of the toggle and the swivel, and consequently said lever will be automatically held in its locking position by the pressure of the clamps. Therefore there is no danger that the clamp will open and the skate become detached.

I am aware that a hand-lever has been used for moving simultaneously a pair of sole-clamps, and a movable spur or hook adapted to bear against the breast of the heel; but my experience with all skates of this kind has been that they are liable to become detached from the foot and to trip the skater, because by the spring of the skate-runner under the pressure of the foot the tendency of the clamps is to loosen. I have also found that the pressure of such spur, in connection with the weight of the skater upon the inside of the arch of the skate-runner, strains and very often breaks such runner.

In my skate I have provided clamps so drawn toward each other longitudinally that if, by the pressure of the foot, the runner should spring, the clamps are tightened and their grasping power is increased, and they are caused to tie the runner longitudinally, so that the liability of breakage is removed. I do not therefore claim, broadly, as my invention the combination of a hand-lever with any mechanism for clamping the sole and the heel.

What I claim as new, and desire to secure by Letters Patent, is—

1. The combination, in a skate, of movable clamps for grasping the sole, of longitudinally-sliding clamps for grasping the heel at the back part thereof, a stationary spur or abutment for the breast of the heel, and a hand-lever adapted to operate both sets of the clamps, substantially in the manner herein shown and described.

2. The combination, in a skate, of heel and toe clamps, and a suitable lever connected therewith, said lever being pivoted out of a central line longitudinally between the clamps, and adapted to move on or in a plane substantially parallel with the heel and toe plates of the skate, for the purposes set forth.

3. The combination, with movable clamps for grasping the sole, longitudinally-sliding clamps for grasping the heel at the back part thereof, and with a hand-lever adapted to operate both sets of clamps, of a toggle, D, a swivel, D′, and a regulating-screw, F, substantially as and for the purpose shown and described.

4. The combination, with movable clamps for grasping the sole, longitudinally-sliding clamps for grasping the heel at the back part thereof, a stationary spur or abutment for the breast of the heel, and with a hand-lever adapted to operate both sets of clamps simultaneously, of a regulating-screw for adjusting the two sets of clamps to soles and heels of different sizes, substantially as set forth.

In testimony that I claim the foregoing I have hereunto set my hand and seal this 6th day of December, 1878.

CHARLES T. DAY. [L. S.]

Witnesses:

W. HAUFF,

E. F. KASTENHUBER.